Figure 1:
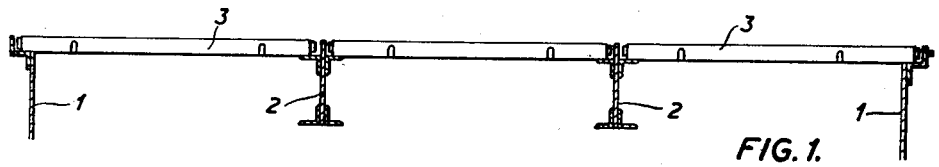

June 3, 1952 C. G. GUTHRIE 2,599,106
HATCH COVER
Filed Feb. 2, 1948 3 Sheets-Sheet 1

CHARLES GUTHRIE GUTHRIE, Inventor
By
Attorney

June 3, 1952 C. G. GUTHRIE 2,599,106
HATCH COVER
Filed Feb. 2, 1948 3 Sheets-Sheet 2
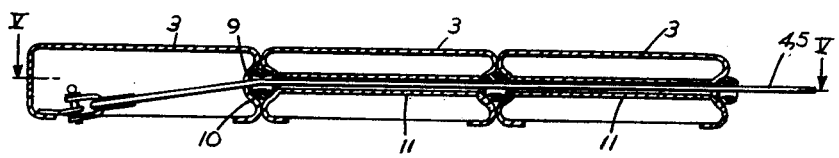
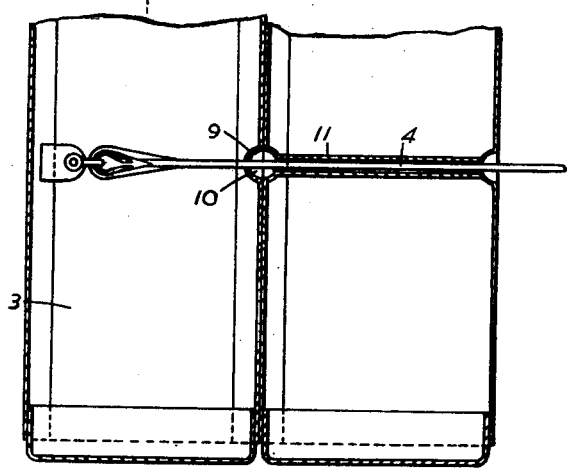
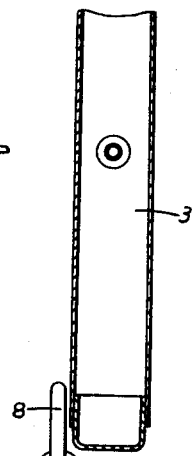
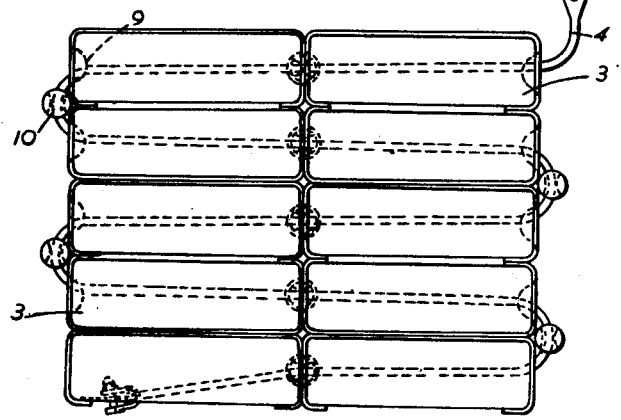
Attorney

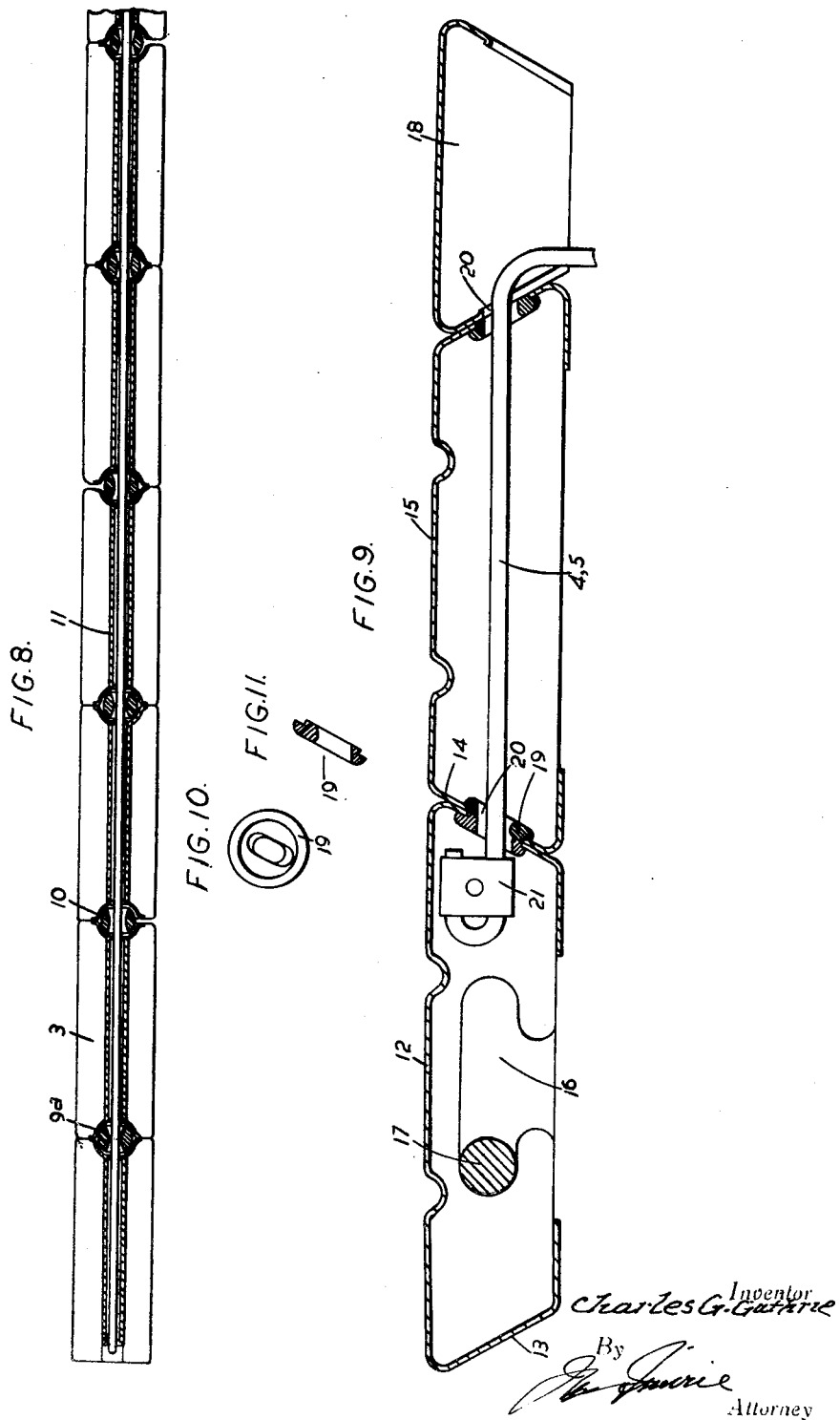

Patented June 3, 1952

2,599,106

UNITED STATES PATENT OFFICE 2,599,106

HATCH COVER

Charles Guthrie Guthrie, Formby, England, assignor to M. E. P. Company Limited, Liverpool, England, a British company Application February 2, 1948, Serial No. 5,772
In Great Britain October 1, 1946

2 Claims. (Cl. 160—232)

This invention is for improvements in or relating to hatches and particularly hatches for ships and the like and hatch covers for use therewith.

At the present time it is necessary in removing hatch covers from a hatch, for the deck-hands or other persons handling the covers to walk across the hatch beams. This is a dangerous practice and at the present time there is an urgent requirement for a hatch cover arrangement by which hatches can be opened up and closed, i. e. the covers can be removed and replaced, without necessitating movement of the deck-hands out onto the hatch beam. One object of the present invention is to meet this requirement.

According to the present invention there is provided in or for use in a hatch such as a ship's hatch, a hatch cover assembly comprising a plurality of hatch covers articulated or hinged together. One advantage of the arrangement according to the invention is that a plurality of covers can be lifted en bloc from over the hatch opening or coaming and when lowered over said opening or coaming can be drawn out from the end or sides thereof and set in position without necessitating movement of the deck-hands out onto or across the hatch beams.

In the preferred embodiment of the invention a plurality of hatch covers are articulated together edge to edge by having wires, chains or cables passed through them so that, in effect, they are threaded on a chain or cord after the manner of a series of beads threaded on a string except that in the case of the hatch covers there will be more than one string. To remove a whole hatch or section of covers it is only necessary to hook up one cover or the cable or chain with a derrick or crane and raise and swing the whole assembly of covers clear of the hatchway and into some convenient position on the deck where, when released, all the covers will collapse into a relatively neat and compact pile. To set the covers in position again, it is only necessary to raise the complete assembly by means of a crane or derrick and then lower it over the hatchway or coaming with a man or men at one or both ends of the hatch to hold the outboard cover or covers in place on the coaming, so that the covers are positioned over and close the hatchway as they are lowered. Instead of linking the covers together by means of cables or chains they may, for example, be hinged together by links on their ends which are preferably set into recesses in the sides of the covers.

One embodiment of the invention will now be described, by way of example, as applied to a sheet steel hatch cover constructed somewhat after the manner described in my Patents Numbers 448,822 and 490,425. It is not essential, however, with the arrangement according to the present invention to provide the covers with any interlocking arrangement for locking them together or to the coaming individually.

Each cover comprises a sheet of steel having downturned and inturned sides and ends. A plurality of these covers are assembled together side by side with pairs of holes in neighbouring sides registering one pair with the other. Two wire cables are passed right through these holes to articulate the several hatch covers together. A ring or rings may be provided on the cables at their inboard ends or about midway along their length, that is, between half sets of hatch covers. The cables are extended beyond the ends of the hatch cover assembly so that they can be used in handling the hatch covers, means being provided for retaining the covers on the cables. Presuming that the hatch cover assembly is lying on the deck all that is necessary to cover a whole section of the hatchway is to attach a derrick or crane to the lifting ring or rings and raise the hatch cover assembly and swing it over the hatchway, the outboard cover or covers of the hatch cover assembly being held by deck hands on one or both sides of the hatchway. The hatch cover assembly is then lowered on to the ledges provided on the hatch beams and/or the coaming and the deck-hands hang onto the outboard cover or covers so as to cause the whole cover assembly to extend and spread itself over the hatchway. The deck-hands do not have to walk out over the hatchway with risk of falling into the hold.

To remove the hatch cover assembly the derrick or crane is attached to the aforementioned ring or rings and the whole assembly is removed en bloc. When lowered onto the deck it will, due to the articulation together of the several covers, collapse into a relatively neat and compact pile.

The outermost covers of the assembly, that is, the covers at the fore and aft ends or port and starboard sides of the hatchways may be arranged to interlock with the coaming and there may be a special and separate locking cover for location say midway between the hatch cover assembly and adapted to be locked to the coaming. This is all that is necessary to lock all the covers to the coaming. As an alternative securing arrangement the cables or chains which are passed through the covers may have their ends fastened to the coaming, holes being provided in the coaming for that purpose.

Figure 2:
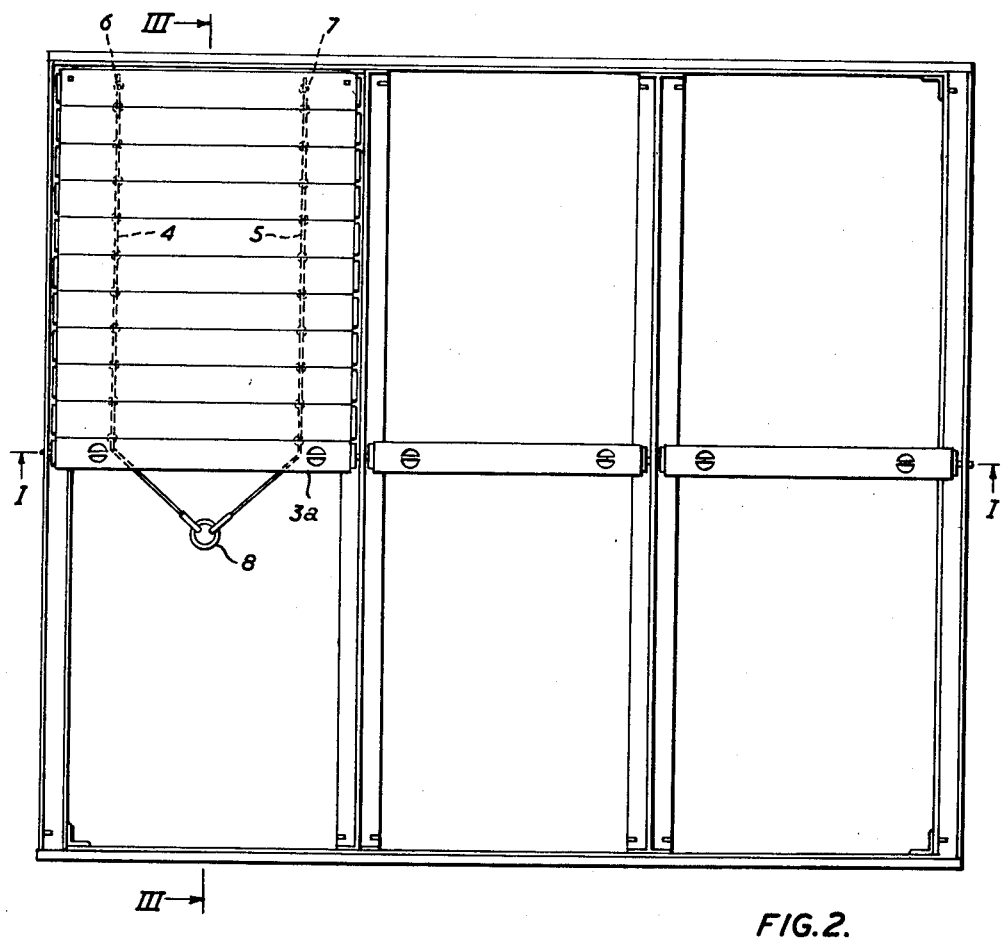
Figure 3:
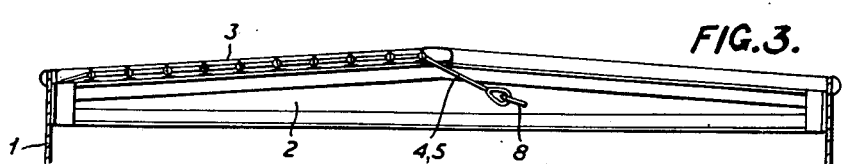

The invention will be further described, by way of example, with reference to the accompanying drawings, whereon:

Figure 1 is a diagrammatic fore and aft sectional elevation through a ship's hatch, the section being on the line I—I of Figure 2, Figure 2 is a plan view of the hatch shown in Figure 1, Figure 3 is a cross-section on the line III—III of Figure 2, Figure 4 is a detail view of one embodiment of the invention as applied to a series of steel hatch covers, Figure 5 is a sectional plan view on the line V—V of Figure 4, Figure 6 is a sectional side elevation on the line VI—VI of Figure 5, Figure 7 shows the manner in which the hatch cover assembly shown in Figures 4 and 5 may be neatly and compactly stacked after removal from the hatch coaming, Figure 8 shows an embodiment of the invention applied to a series of wooden hatch covers, Figure 9 shows an embodiment of the invention applied to a series of interlocking, metal hatch covers of the character described in my British Patents Nos. 448,822 and 490,425.

Figure 10 is a face view of a ferrule or eyelet used in the embodiment of the invention shown in Figure 9, and Figure 11 is a cross-section through the ferrule or eyelet shown in Figure 10.

Referring to Figures 1 to 3 of the drawings, the reference numeral 1 indicates a hatch coaming and 2 indicates the hatch-beams. The coaming and hatch-beams serve to support the hatch covers 3 in the usual way.

For the purpose of the present invention the hatch covers are hinged or flexibly connected together by threading them on a pair of wire ropes, cables, chains or the like 4 and 5. The ends 6 and 7 of the ropes are anchored to the outermost cover whilst the opposite ends are connected to a lifting ring 8. When the covers are in position on the coaming the lifting ring 8 may hang down into the hatch.

Figures 4 to 7 show the invention applied to sheet metal covers. In the example shown the sides of the hatch covers are provided with hemispherical sockets 9 for balls 10. The cables 4 and 5 pass through flared holes in the balls 10 and through metal tubes 11 secured to and extending between the sockets 9 on opposite sides of the cover. This ball and socket arrangement provides for the required flexible connection of the covers one to another with a minimum of wear on the cables 4 and 5.

Figure 8 shows a ball and socket arrangement similar to that just described with reference to Figures 4 to 7 but applied to wooden covers. In this case metal sockets 9a, for the balls 10, are secured in the sides of the wooden covers which are bored to receive the metal tubes 11.

Figure 9 shows the invention applied to hatch covers of the interlocking kind, i. e. the kind in which a locking cover 12 has bevelled edges 13 which overlie the bevelled edges 14 of neighbouring covers 15 to hold them down on the coaming. The locking covers may have bayonet slots 16 at their ends which interlock with pins 17 or the like on the coaming and hatch-beams to secure the locking covers to the coaming. The whole cover assembly is secured in the coaming by a special locking cover 18 adapted to be locked, say by a padlock, to the coaming or hatch beams. For the purpose of the present invention the several interlocking covers are articulated together by cables 4 and 5 which pass through ferrules 19 welded or otherwise secured in the side walls of the covers. The ferrules are in two identical halves, one half being shown in detail in Figures 10 and 11. The two halves are shaped so that even although they are of identical shape to cheapen construction and facilitate replacement they can, by mating them in the manner shown, be arranged to give a straight through hole 20 for the smooth passage of the cables 4 and 5. A cable clamp 21 is secured to the free end of each cable to retain it in the outermost cover.

A wooden hatch cover usually comprises at least two planks secured together side edge to side edge by through bolts or the like. For the purpose of the present invention metal tubes, similar to the tubes 11, may be substituted for these bolts the ends of the tubes being screwed to receive nuts, riveted over or bell mouthed so as to secure the planks forming the cover together. The wires, cables or chains for articulating the covers together are then threaded through these tubes, the tubes in one cover registering with the tubes in its neighbour or neighbours.

As an alternative to taking the wires or cables through the covers they may be taken through eyes or staples on the bottom and/or top of the covers.

The covers instead of being of wood or metal may be mouldings of plastic or resin treated plywood.

I claim:

1. A hatch cover comprising a plurality of parallel contiguous hollow cover elements having tubes extending transversely through the cover elements from one side to the other side thereof said tubes having their ends formed as part-spherical sockets in the side edges of said cover elements, a plurality of flexible lines threaded transversely through said cover elements, via said tubes, flexibly to connect said cover elements as a unit, and balls in said sockets in the ends of the tubes, said balls being threaded on the flexible lines to provide ball and socket devices at the sides of the cover elements to facilitate articulation thereof.

2. A hatch cover as defined in claim 1 wherein each cover element comprises a plank and said planks are reinforced by the tubes.

CHARLES GUTHRIE GUTHRIE.

REFERENCES CITED

The following references are of record in the file of this patent:

UNITED STATES PATENTS

| Number | Name | Date |
|---|---|---|
| 935,431 | Tackman | Sept. 28, 1909 |
| 1,262,643 | Coleman | Apr. 16, 1918 |

FOREIGN PATENTS

| Number | Country | Date |
|---|---|---|
| 40,213 | Germany | Aug. 2, 1887 |
| 497,682 | Great Britain | Dec. 23, 1938 |
| 623,817 | Great Britain | May 24, 1949 |